United States Patent [19]

Jennings

[11] 4,231,432
[45] Nov. 4, 1980

[54] POSITION AND DRAFT CONTROL SYSTEM FOR PLOWS

[75] Inventor: Marvin D. Jennings, Hendersonville, N.C.

[73] Assignee: International Harvester Company, Chicago, Ill.

[21] Appl. No.: 945,146

[22] Filed: Sep. 22, 1978

[51] Int. Cl.³ .......................................... A01B 63/112
[52] U.S. Cl. .......................................... 172/7; 172/2
[58] Field of Search ...................... 172/4, 7, 4.5, 2, 9, 172/11, 12; 37/DIG. 1, DIG. 20

[56] References Cited

U.S. PATENT DOCUMENTS

| 3,630,290 | 12/1971 | Williams et al. | 172/7 |
| 3,736,988 | 6/1973 | Cantral et al. | 172/7 |
| 4,064,945 | 12/1977 | Haney | 172/9 |
| 4,107,859 | 8/1978 | Keith | 172/4 |
| 4,120,364 | 10/1978 | Wooldridge | 172/4 |
| 4,121,852 | 10/1978 | Quanbeck | 172/413 |
| 4,132,272 | 1/1979 | Holloway et al. | 172/2 |
| 4,133,391 | 1/1979 | Richardson et al. | 172/311 |
| 4,159,474 | 6/1979 | Wooldridge | 172/2 |

FOREIGN PATENT DOCUMENTS

| 1439656 | 6/1976 | United Kingdom | 172/7 |
| 116384 | 1/1959 | U.S.S.R. | 172/4 |

Primary Examiner—Richard T. Stouffer
Attorney, Agent, or Firm—Neal C. Johnson; F. David AuBuchon

[57] ABSTRACT

A control system is provided for a plow including forward and rearward hingedly connected frame sections each carrying a plurality of plow bottoms and forward, intermediate and rearward linkage assemblies each including a hydraulic actuating cylinder, supporting the forward end of the forward frame section, the junction between the frame sections and the rearward end of the rearward section. The control system includes electrical circuitry which controls solenoid-actuated valves of a hydraulic system with separate portions of the circuitry being operable for controlling the respective linkage assemblies but with an operation such that only one hydraulic cylinder is operable at any one time to minimize load requirements. In a raising operation, the forward and intermediate linkage assemblies are sequentially operated. Another feature is a draft control arrangement which includes a dither circuit operative to alternately adjust the forward and intermediate linkage assemblies.

15 Claims, 1 Drawing Figure

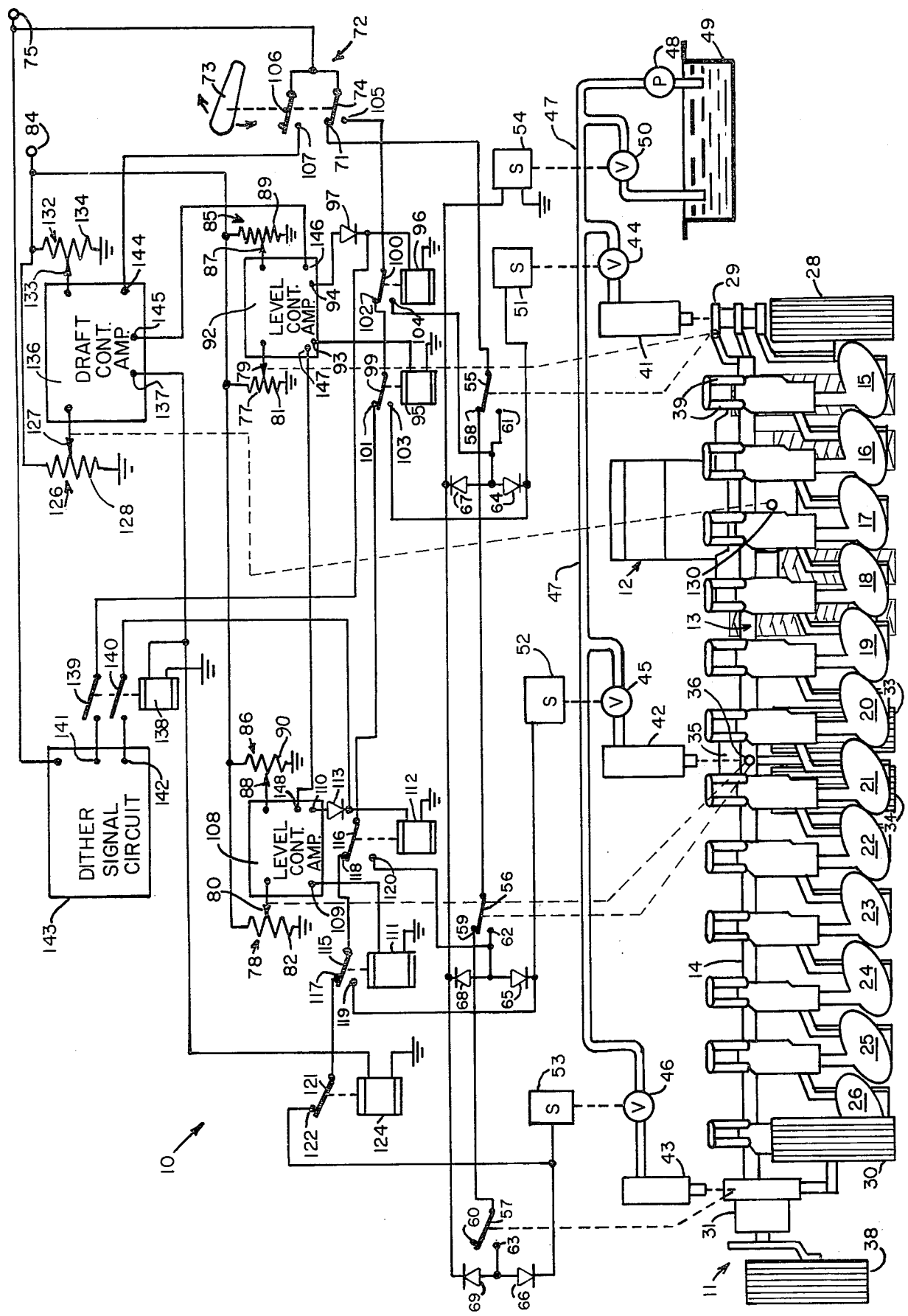

POSITION AND DRAFT CONTROL SYSTEM FOR PLOWS

BACKGROUND OF THE INVENTION

To achieve high productivity in farming, it is desirable to be able to plow acreages of large size as rapidly as possible in order to plant seeds at an optimum time. Delays in plowing oftentimes result in a great decrease in productivity, especially when weather conditions are encountered which make it necessary to postpone completion of plowing until a much later date. As a result, the use of plows having a large number of bottoms is desirable to have a large plowing width per pass. Multi-section plows as well as plows having a single frame carrying a smaller number of bottoms present problems in control of the plowing depth and systems heretofore proposed have either been complicated in construction and operation, oftentimes requiring a large number of controls, or have not achieved adequate control of plowing depths. Reliability has also been a problem in attempting to provide plows with automatic controls.

SUMMARY OF THE INVENTION

This invention was evolved with the general object of overcoming the disadvantages of prior systems and of providing a system which provides accurate and highly reliable control of the elevation of plow bottoms, which is readily operable and which achieves a highly efficient plowing operation.

In accordance with this invention, a control system is provided for a plow in which electrically controllable level control means are provided for controlling the elevation of spaced portions of frame means with respect to supporting wheel means. In the system, a circuit is provided for each of the level control means which has a pair of inputs, a signal of adjustable magnitude being applied to one input and a signal being applied to the other input from sensing means mechanically coupled to the control means and operative to apply a signal corresponding to the level of the portion of the frame means which is supported. With this arrangement, the respective portions of the frame means can be maintained at preset levels and the preset level can be readily changed by adjustment, as required according to differing soil conditions.

The system is usable with a multi-section plow of a type including forward and rearward hingedly connected frame sections each of which carries a plurality of plow bottoms and forward, intermediate and rearward linkage assemblies which support the forward end of the forward frame section, the junction between the frame sections and the rearward end of the rearward section. Each of the linkage assemblies may preferably include a hydraulic actuating cylinder coupled through a solenoid operated valve to a flow line which is coupled to a pump outlet and also to a solenoid-operated bypass valve to a reservoir.

The level control circuits may preferably operate to maintain the forward and intermediate linkage assemblies at preset levels while the rearward linkage is allowed to "float" at a level determined by the ground conditions encountered by the rearward plow bottoms.

In accordance with a specific feature of the invention, an interlock arrangement is provided such that only one of the linkage control circuits is operable at one time, preventing any undesirable interaction therebetween and minimizing the peak load imposed on the hydraulic system used to operate the assemblies. In the raising operation, the first linkage is preferably raised first, followed by the intermediate linkage and then by the rearward linkage and the same order of sequential operation is preferably also used in the lowering operation.

Further important features of the invention relate to the provision of means for automatically controlling the levels in accordance with the draft force applied in pulling the plow to prevent stalling and possible damage to the equipment and to otherwise obtain continued and efficient operation even when encountering obstacles and unusually heavy soil conditions. A draft signal which is proportional to the draft force and a signal of adjustable magnitude are applied to inputs of a draft control circuit which controls operation of linkage assemblies in accordance with a comparison of such signals. Preferably the forward and intermediate linkage assemblies are controlled and, in accordance with a specific feature, a dither circuit is provided, operable to alternately elevate the linkage assemblies through short distances until the draft is reduced below a preset level.

Additional features of the invention relate to specific circuit arrangements through which the operations are preformed with a high degree of accuracy and reliability.

This invention contemplates other objects, advantages and features which will become more fully apparent from the following detailed description taken in conjunction with the accompanying drawing.

BRIEF DESCRIPTION OF THE DRAWING

The single FIGURE of the drawing is a rear elevational view of a multi-section plow pulled by a tractor, showing diagrammatically the position and draft control system constructed in accordance with the invention and connected to the plow.

DESCRIPTION OF A PREFERRED EMBODIMENT

Reference numeral 10 generally designates a position and draft control system constructed in accordance with the principles of this invention. The illustrated system is designed for control of a multi-section plow such as a plow generally designated by reference numeral 11, pulled by a tractor 12. The plow 11 has a two-piece main frame with a center hinge which permits up and down flexing to allow plow bottoms to follow ground contours over ridges and through dips. In particular, the plow 11 includes a forward frame section 13 which is coupled to a drawbar of the tractor 12 and a rearward frame section 14, six plow bottoms 15–20 being carried by the forward frame section 13 and six additional plow bottoms 21–26 being carried by the rearward frame section 14. During plowing, the frame sections 13 and 14 extend angularly rearwardly and to the left, the right-hand bottom 15 being at the most forward position and each of the other bottoms 16–26 being spaced to the left and rearwardly from the preceding bottom.

The forward and rearward frame sections 13 and 14 are supported by wheels including a front wheel 28 which is connected through a linkage assembly 29 to the right and forward end of the forward frame section 13 and a rear wheel 30 connected through a linkage assembly 31 to the left and rearward end of the rear frame section 14. A pair of intermediate wheels 33 and 34 are connected through a linkage assembly 35 to a junction 36 between the left and rearward end of the forward frame section 13 and the right and forward end of the rearward frame section 14. The junction 36 includes a hinge connection which provides the flexibility indicated above, permitting operation on rolling fields while obtaining a plowing depth which is much more uniform than would be the case with a rigid frame.

A steering mechanism may be associated with the rear wheel 30 to maintain the plow frame at the proper angle and the plow bottoms 15-26 in the proper relationship during plowing or to swing the plow in a direction such as to trail directly behind the tractor 12 during transport and maneuvering. A wheel 38 is connected to the left and rear end of the frame section 14 for riding over the ground to the left of the left and rear bottom 26 during plowing.

The plow bottoms 15-26 are supported from the frame sections in a manner known in the art. Thus bottom 15 may be supported from the frame section 13 through an automatic reset beam assembly including springs in cylindrical housings 39, the construction with respect to each of the other plow bottoms being the same.

The wheel linkage assembly 29, 35 and 31 respectively include hydraulic cylinders 41, 42 and 43 which control the elevations of the respective portions of the frame sections 13 and 14. Such cylinders 41, 42 and 43 are shown diagrammatically, by dotted lines, as connected to the linkage assemblies and it will be understood that they are physically incorporated in the linkage assemblies in a manner such as to control the elevation of the corresponding portions of the frame sections 13 and 14.

Hydraulic cylinders 41, 42 and 43 are coupled through valves 44, 45 and 46 to a line 47 which is coupled to the outlet of a pump 48 having an inlet coupled to a reservoir 49 with a bypass valve 50 being connected between the pump outlet line 47 and the reservoir 49. Valves 44-46 and 50 are respectively controlled by solenoids 51, 52, 53 and 54 and each valve may be of a type known in the art wherein the solenoid controls a small pilot valve section which, in turn, hydraulically controls a main valve section. All of the valves 44-46 and 50 together with the operating solenoids 51-54 may be incorporated in a common housing.

With all of the solenoids 51-54 de-energized, the valves 44-46 are closed and the bypass valve 50 is open. To raise the forward, right-hand end of the forward frame section 13, the solenoid 54 is energized to close the bypass valve 50 and to develop pump outlet pressure in the line 47 while the solenoid 51 is energized to open the valve 44 and to supply fluid under pressure into the cylinder 41. Solenoid 51 is also energized to open the valve 44 for lowering but the solenoid 54 is de-energized to open the valve 50, allowing the force of the weight on the forward right-hand end of the frame section 13 to force fluid out of the cylinder 41 and through valves 44 and 50 into the reservoir 49. The operation is similar with respect to the raising and lowering of the intermediate junction 36 between the frame sections 13 and 14 and with respect to the raising and lowering of the rearward, left-hand end of the rearward frame section 14, solenoid 52 or 53 being energized for either a raising or a lowering operation and solenoid 54 being energized for a raising operation and de-energized for a lowering operation.

The control system of this invention automatically controls the lowering and raising operations in an optimum manner when initiating and discontinuing plowing and automatically controls the levels at the wheel linkages at set values to control the levels of the plow bottoms and to obtain optimum operation during plowing. In addition, the system automatically controls the levels of wheel linkages in accordance with draft forces applied from the tractor, to prevent such draft forces from being unduly large when obstructions or unusually heavy soil conditions are encountered.

For control in the raising and lowering operation, the system includes switch contacts 55, 56 and 57 which are mechanically coupled to the linkage assemblies 29, 35 and 31, respectively, as diagrammatically indicated by dotted lines. Contacts 55-57 are in the positions as illustrated in engagement with fixed contacts 58-60, in the fully raised positions of the linkage assemblies and are engaged with contacts 61-63 when the linkage assemblies are lowered away from the fully raised positions. Contacts 61-63 are connected through 64-66 to the solenoids 51-53 and are also connected through diodes 67-69 to the solenoid 54. Movable contact 57 is connected to the fixed contact 59, movable contact 56 is connected to the fixed contact 58 and movable contact 55 is connected to a contact 71 of a raise-lower switch unit 72 including an operating handle 73 mechanically connected to a switch contact 74 which is engaged with the contact 71 in the "raise" position of the switch unit as illustrated. Movable contact 74 is connected to a voltage supply terminal 75 which may be connected to the positive terminal of a twelve volt supply, for example.

With respect to the raising operation, it may be assumed that all three of the wheel linkage assemblies 29, 35 and 31 are in lowered conditions and that contacts 55, 56 and 57 are engaged with contacts 61, 62 and 63. When switch unit 72 is then placed in the raise position as illustrated, with contact 74 being engaged with contact 71, current flows from the supply terminal 75 through contact 74 to contact 71 and then through contact 55 to contact 61 and through diodes 64 and 67 to the solenoids 51 and 54 to open the valve 44 while closing the bypass valve 50. Fluid then flows from the pump outlet through line 47 and valve 44 to the cylinder 41 to raise the linkage assembly 29 and raise the forward, right-hand end of the frame section 13. When such are fully raised, contact 55 engages contact 58 and current then flows through contact 56 to contact 62 and thence through diodes 65 and 68 to the seleniods 52 and 54 to operate in a similar fashion to raise the linkage assembly 35 and the junction 36 between the frame sections 13 and 14. When such are fully raised, contact 56 engages the contact 59 and current flows through the contact 57 to the contact 63 and thence through diodes 66 and 69 to the solenoids 53 and 54 to open the valve 46 and keep valve 50 closed. In a similar manner, the right-hand, rearward end of the frame section 14 is elevated and when it is in its fully raised position, contact 57 engages the contact 60 and all of the contacts are in the positions as illustrated which is the fully raised condition of the plow.

For control of the level of the plow bottoms during plowing, the system further includes a pair of potentiometers 77 and 78 which have movable contacts 79 and 80 mechanically coupled to the linkage assemblies 29 and 35, as diagrammatically indicated by dotted lines, and which have resistance elements 81 and 82 connected between ground and a voltage supply terminal 84 which may be at a regulated positive voltage of 10 volts, for example. An additional pair of potentiometers 85 and 86 are provided having movable contacts 87 and 88 and having resistance elements 89 and 90 connected between ground and the voltage supply terminal 84. Potentiometers 85 and 86 are used for setting the levels of the linkage assemblies 29 and 35, contacts 87 and 88 being adjustable to set the desired respective levels.

The potential of the contact 79 is proportional to the actual level of the linkage assembly 29 and is compared with the potential of the contact 87 to control adjustment of the level of the linkage 29 until it is at a preset level. In particular, contacts 79 and 87 are connected to inputs of a level control amplifier 92 having output terminals 93 and 94 connected to relays 95 and 96, a diode 97 being connected in series between terminal 94 and relay 96. Relays 95 and 96 have movable contacts 99 and 100 engaged with fixed contacts 101 and 102 when the relays are de-energized and engaged with fixed contacts 103 and 104 when the relays are energized. Contact 99 is connected to the contact 102 and contact 100 is connected to a contact 105 of the raise-lower switch unit 72, engaged by the contact 74 in the "lower" position. Contact 103 is connected to the solenoid 51 and contact 104 is connected through diodes 64 and 67 to the solenoids 51 and 54.

When the raise-lower switch unit 72 is placed in its "lower" position, contact 74 is engaged with contact 105 and at the same time, another contact 106 of the switch 72 is engaged with a fixed contact 107 to apply power to the level control amplifier 92 in a manner as hereinafter described. With power applied to the level control amplifier 92 and assuming that the level of the linkage 29 is above the preset desired level determined by potentiometer 85, the level control amplifier 92 develops an output signal at the terminal 93 to energize the relay 95 and to engage contact 99 with contact 103. Current then flows from the power supply terminal 75 through contacts 74, 71, 100, 102, 99 and 103 to the solenoid 51 to open the valve 44 and to allow fluid to flow from the cylinder 41 through valve 44 and valve 50 to the reservoir 49, solenoid 54 being de-energized so that the valve 50 is open. The linkage assembly 29 is then lowered until the signals from potentiometers 77 and 85 are brought into balance, whereupon the relay 95 is de-energized to disengage contact 99 from contact 103 and to de-energize the solenoid 51. If the level should drop below the desired level an output signal is developed at output terminal 94 which is applied through diode 97 to energize the relay 96 and to engage contact 100 with contact 104. Current then flows from supply terminal 75 through contacts 74, 71, 100 and 104 and through diodes 64 and 67 through the solenoids 51 and 54 to energize both. The bypass valve 50 is then closed and pump pressure is applied through line 47 and valve 44 to the cylinder 41 to raise the linkage assembly 29.

The control of the linkage assembly 35 from the potentiometers 78 and 86 is similar. Contacts 80 and 88 of potentiometers 78 and 86 are connected to inputs of a second level control amplifier 108 having output terminals 109 and 110. Terminals 109 and 110 are connected to relays 111 and 112, a diode 113 being connected between terminal 110 and relay 112. Relays 111 and 112 have movable contacts 115 and 116 engaged with fixed contacts 117 and 118 when the relays are de-energized and engaged with fixed contacts 119 and 120 when the relays are energized. Contact 115 is connected to contact 118, contact 116 is connected to contact 101 of relay 95, contact 119 is connected to the solenoid 52 and contact 120 is connected through diodes 65 and 68 to the solenoids 52 and 54.

After the linkage 29 is adjusted in the manner as above described and relays 95 and 96 are both de-energized, current may flow through contacts 74, 105, 100, 102, 99 and 101 to the contact 116 and the operation in control of the linkage 35 is then similar to that of the operation in control of the linkage 29 as above described, a lowering operation being performed with relay 111 energized and the raising operation being performed with relay 112 energized.

After the level of the linkage 35 is adjusted to the preset level, both relays 111 and 112 are de-energized and current may flow through contacts 116, 118, 115 and 117 and through a movable contact 121 to a fixed contact 122 connected to the solenoid 53. Movable contact 121 is normally engaged with contact 122 such contacts being those of a relay 124 which is normally de-energized. Thus solenoid 53 may be energized to open the valve 46 and to allow fluid flow from the cylinder 43 to valve 46, line 47 and bypass valve 50 to the reservoir 49 to lower the rearward linkage 31. The rearward linkage 31 in the illustrated embodiment is allowed to "float", the level being controlled by the ground conditions encountered, especially the ground conditions encountered by the most rearward plow bottoms.

It is noted that the circuit provides an interlock such that the levels of no two of the linkage assemblies can be simultaneously adjusted or changed. Thus the solenoid 53 can be energized to lower the rearward linkage only after both of the level control amplifiers 92 and 108 are brought into balance to de-energize the relays 95, 96, 111 and 112. Also, for the raising operation, solenoid 53 can be energized only if both of the linkages 29 and 35 are first in their respective raised conditions to engage contact 55 and 56 with contacts 58 and 59 as illustrated.

Similarly, solenoid 52 can be energized from control by the relays 111 and 112 only if the level control amplifier 92 for the linkage 29 is first brought into balance to de-energize both relays 95 and 96.

Another important feature of the system is in the automatic control of the levels of the forward and intermediate wheel linkages 29 and 35 in accordance with the draft or pulling force exerted by the tractor 12 on the plow 11. A potentiometer 126 is provided having a movable contact 127 and having a resistance element 128 connected between ground and the voltage supply terminal 84. Movable contact 127 is mechanically coupled to a device 130 provided in the coupling between the drawbar of the tractor 12 and the plow 11. Device 130 includes an element which is deformed in proportion to the draw force, with the contact 127 being moved in proportion to the deformation of such element. Another potentiometer 132 is provided having a movable contact 133 and having a resistance element 134 which is connected between ground and the voltage supply terminal 84. Contact 133 is adjustable to determine the allowable draft or drawing force applied to the plow 11 and the potential at contact 133 is compared to the potential at contact 127 to control the elevation of the forward and intermediate wheel linkages 29 and 35. In particular, contacts 127 and 133 are connected to inputs of a draft control amplifier 136 having an output terminal 137 connected to the relay 124 and also connected to a relay 138 which has movable contacts 139 and 140 connected to the relays 96 and 112 and engageable with fixed contacts which are connected to output terminals 141 and 142 of a dither signal circuit 143 which has a supply voltage input terminal connected to the voltage supply terminal 75.

The dither signal circuit 143 which may, for example, include a free-running multivibrator, which alternately develops pulse signals of short duration at the output terminals 141 and 142 and when the draft exceeds the level set by potentiometer 132, the relay 138 is energized from the output of the draft control amplifier 136 and the dither signals are applied through contacts 139 and 140 to the relays 96 and 112. As a result, alternate raising operations are performed on the forward and intermediate linkages 29 and 35. When the levels are increased to a point at which the draft is below that set by the potentiometer 132, the relay 138 is de-energized to disconnect relays 96 and 112 from the output terminals 141 and 142 of the dither signal circuit. Accordingly, the wheel linkage assemblies 29 and 35 are "inched up" in response to an excessive draft, such as caused by an obstruction or an unusually heavy soil condition. The tractor can continue moving the plow along and when the obstruction or unusually heavy soil condition is cleared, normal operation is reinstituted. The dither operation causes both linkages to be effectively raised together rather than sequentially. If, for example, an obstruction were encountered only at a central location, say in alignment with the intermediate wheel linkage assembly 35, the linkage assembly 29 would be raised completely in a sequential operation, before instituting the raising of the intermediate linkage assembly 35. As a result, a substantial area of the field would not be plowed.

Power for the draft control amplifier 136 is supplied from the switch unit 72 in its "lower" position from contact 107 connected to contact 144 of the amplifier 136. With power applied to terminal 144, power is applied from a terminal 145 of amplifier 136 to a terminal 146 of amplifier 92 and, in turn, power is then applied from a terminal 147 of amplifier 92 to a terminal 148 of amplifier 108.

It will be understood that modifications and variations may be effected without departing from the spirit and scope of the novel concepts of this invention.

What is claimed is:

1. In a control system for a plow including frame means arranged to extend angularly from a forward end to a rearward end, a plurality of plow bottoms carried by said frame means, first wheel means for supporting a first portion of said frame means and second wheel means for supporting a second portion of said frame means spaced rearwardly from said first portion, power source means, and first and second electrically controllable level control means supplied with power from said power source means for effecting changes in the elevation of said first and second portions of said frame means with respect to said first and second wheel means, first and second level control circuits electrically coupled to said first and second level control means, each of said circuits having first and second inputs and being operative to apply signals to the corresponding level control means to raise and lower the corresponding portion of said frame means in accordance with the difference between signals applied to said first and second inputs, first and second adjustable means coupled to said first inputs to apply signals of adjustable magnitude thereto, first and second position sensing means mechanically coupled to said control means and electrically coupled to said second inputs to apply signals to said second inputs corresponding to the levels of said first and second portions of said frame means, and control circuit means for preventing operation of one of said level control means at any time when the other of said level means is operative in performing either a raising or a lowering operation to thereby prevent simultaneous operation on both of said level control means and to thereby minimize the load on said power source means.

2. In a system as defined in claim 1, said control circuit means including interconnection means between said first and second circuits to prevent operation of one of said circuits at any time when the other is operative in performing either a raising or a lowering operation.

3. In a system as defined in claim 1, manually actuable switch means connected to said control circuit means and having raise and lower positions, said control circuit means being operative to render said first and second level control circuits operable in said lower position of said switch means and inoperable in said raise position of said switch means, and said control circuit means including raise control means operative in said raise position of said switch means for applying a signal to said first control means to fully raise said first portion of said frame means and for thereafter applying a signal to said second control means to fully raise said second portion of said frame means.

4. In a circuit as defined in claim 1, a draft control circuit having first and second inputs, means coupling said draft control circuit to said first and second level control means to control raising of both of said first and second portions of said frame means in accordance with the difference between signals applied to said first and second inputs of said draft control circuit, adjustable means coupled to said first input of said draft control circuit to apply a signal of adjustable magnitude thereto, and draft sensing means for applying to said second input of said draft control circuit a signal having a magnitude proportional to the draft force applied in pulling said plow.

5. In a system as defined in claim 4, said control circuit means including dither means associated with said draft control circuit for alternately applying signals of short duration from said draft control circuit to said first and second level control means to alternately move said first and second frame portions upwardly through short distances until a balanced condition is achieved between the signals applied to said first and second inputs of said draft control circuit means.

6. In a system as defined in claim 1, wherein said frame means comprises forward and rearward frame sections each carrying a plurality of said plow bottoms and a junction between the rearward end of said forward frame section and the forward end of said rearward frame section including a hinge connection, a forward end portion of said forward frame section being supported by said first wheel means, and said junction being supported by said second wheel means, third wheel means for supporting a rearward end portion of said rearward section and third electrically controllable level control means for controlling the elevation of said rearward end portion of said rearward frame section relative to said third wheel means, and a third level control circuit electrically coupled to said third level control means.

7. In a system as defined in claim 6, said third level control circuit being operative to lower said rearward end portion of said rearward frame section after lowering of said forward end portion of said forward frame section and said junction by said first and second level control means.

8. In a system as defined in claim 7, said third level control circuit being additionally operative to raise said rearward end portion of said rearward frame section after raising of said forward end portion of said forward frame section in said junction by said first and second level control means.

9. In a system as defined in claim 6, wherein said first, second and third level control means comprise a fluid flow line, a fluid reservoir, pump means having an inlet coupled to said reservoir and having an outlet coupled to said fluid flow lines, bypass valve means between said said fluid flow line and said reservoir, first, second and third hydraulic cylinder means, first, second and third valve means between said fluid flow line and said first and second hydraulic cylinder means, first, second and third solenoid means for controlling said first, second and third valve means, and additional solenoid means for controlling said bypass valve means, each of said level control circuits being operative to apply signals to the corresponding one of said first, second and third solenoid means and to said additional solenoid means to open the corresponding one of said valve means for both raising and lowering operations and to open said bypass valve means for a lowering operation while closing said bypass valve means for a raising operation.

10. In a system as defined in claim 9, first, second and third limit switches associates with said first, second and third level control means each including a movable contact, a first fixed contact engaged by said movable contact in the fully raised position of the associated portion of said frame means and a second fixed contact engaged by said movable contact when the associated portion of said frame means is lowered away from said fully raised position, connection means between said first contact of said first limit switch and said movable contact of said second limit switch and between said first fixed contact of said second limit switch and said movable contact of said third limit switch, a pair of diodes connected to said second contact of each limit switch, one of each pair of said diodes being connected to the associated one of said first, second and third solenoids and the other of each pair of said diodes being connected to said additional solenoid means, and means for connecting said movable contact of said first limit switch to a voltage source for sequential raising operations of said first, second and third level control means.

11. In a system as defined in claim 1, wherein said first and second level control means comprise a fluid flow line, a fluid reservoir, pump means having an inlet coupled to said reservoir and having an outlet coupled to said fluid flow line, bypass valve means between said fluid flow line and said reservoir, first and second hydraulic cylinder means, first and second valve means between said fluid flow line and said first and second hydraulic cylinder means, first and second solenoid means for controlling said first and second valve means, and additional solenoid means for controlling said bypass valve means, each of said level control circuits being operative to apply signals to the corresponding one of said first and second solenoid means and to said additional solenoid means to open the corresponding one of said valve means for both raising and lowering operations and to open said bypass valve means for a lowering operation while closing said bypass valve means for a raising operation.

12. In a system as defined in claim 11, said first and second valve means being closed when said first and second solenoid means are de-energized and being open when said first and second solenoid means are energized, and said bypass valve means being open when said additional solenoid means is de-energized and being closed when said additional solenoid means is energized.

13. In a system as defined in claim 1, each of said first and second level control circuits comprising a level control amplifier having said first and second inputs connected to said adjustable means and said sensing means and having first and second outputs, and said control circuit means including first and second coupling means between said first and second outputs and the associated one of said level control means.

14. In a system as defined in claim 13, said first coupling means comprising first and second relays connected to said first and second outputs of said first level control amplifier and said second coupling means comprising third and fourth relays connected to said first and second outputs of said second level control amplifier, each of said relays having a movable contact, a first fixed contact engaged by said movable contact when the relay is de-energized and a second fixed contact engaged by said movable contact when the relay is energized, connection means between said movable contact of said first relay and said first fixed contact of said second relay, connection means between said first fixed contact of said first relay and said movable contact of said fourth relay, connection means between said movable contact of said third relay and said first fixed contact of said fourth relay, means for connecting said movable contact of said fourth relay to a voltage source, connection means between said fixed contact of said first relay and said first level control means for effecting a lowering operation, connection means between said second fixed contact of said second relay and said first level control means for effecting a raising operation, connection means between said second fixed contact of said third relay and said second level control means for effecting a lowering operation, and connection means between said second fixed contact of said fourth relay and said second level control means for effecting a raising operation.

15. In a system as defined in claim 14, wherein said frame means comprises forward and rearward frame sections each carrying a plurality of said plow bottoms and a junction between the rearward end of said forward frame section and the forward end of said rearward frame section including a hinge connection, a forward end portion of said forward frame section being supported by said first wheel means, and said junction being supported by said second wheel means, third wheel means for supporting a rearward end portion of said rearward section and third electrically controllable level control means for controlling the elevation of said rearward end portion of said rearward frame section relative to said third wheel means, and a third level control circuit electrically coupled to said third level control means, connection means between said first fixed contact of said third relay and said third control means for effecting a lowering operation.

* * * * *